US008305951B1

(12) United States Patent
Breau et al.

(10) Patent No.: US 8,305,951 B1
(45) Date of Patent: Nov. 6, 2012

(54) CONDITIONAL MEDIA ACCESS CONTROL ADDRESS FILTERING

(75) Inventors: Jeremy R. Breau, Leawood, KS (US); Jason R. Delker, Olathe, KS (US); Manish Mangal, Overland Park, KS (US); Mathew Oommen, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 399 days.

(21) Appl. No.: 12/687,872

(22) Filed: Jan. 14, 2010

(51) Int. Cl.
*H04H 20/71* (2008.01)
(52) U.S. Cl. ........................................... 370/312
(58) Field of Classification Search .................. 370/310, 370/312, 315, 328, 338; 709/220, 223, 230, 709/231
See application file for complete search history.

(56) References Cited

U.S. PATENT DOCUMENTS

| | | | |
|---|---|---|---|
| 6,115,385 A * | 9/2000 | Vig ............................... | 370/401 |
| 6,393,484 B1 | 5/2002 | Massarani | |
| 6,424,650 B1 | 7/2002 | Yang et al. | |
| 7,283,525 B2 * | 10/2007 | Burgess et al. ............. | 370/392 |
| 7,693,132 B1 * | 4/2010 | Cooper et al. ............... | 370/352 |
| 7,768,963 B2 * | 8/2010 | Alizadeh-Shabdiz ........ | 370/328 |
| 7,929,538 B2 * | 4/2011 | Gobara et al. ............... | 370/392 |
| 7,933,268 B1 * | 4/2011 | Melman et al. .............. | 370/389 |
| 7,961,646 B2 * | 6/2011 | Liu et al. ..................... | 370/254 |
| 8,127,162 B2 * | 2/2012 | Satoh .......................... | 713/322 |
| 2006/0245403 A1 * | 11/2006 | Kumar ......................... | 370/338 |
| 2008/0101363 A1 * | 5/2008 | Li ................................ | 370/390 |
| 2008/0235358 A1 * | 9/2008 | Moribe et al. ............... | 709/220 |
| 2009/0228732 A1 * | 9/2009 | Budde et al. ................ | 713/400 |
| 2010/0020796 A1 * | 1/2010 | Park et al. ................... | 370/390 |
| 2010/0211665 A1 * | 8/2010 | Raza et al. ................... | 709/223 |

OTHER PUBLICATIONS

"Address Resolution Protocol", Wikipedia, the free encyclopdia, http://en.wikipedia.org/w/index.php? title=Address_Resolution_Protocol&printable=yes, Sep. 30, 2009.
"Extensible Authentication Protocol", Wikipedia, the free encyclopdia, http://en.wikipedia.org/w/index.php?title=Extensible_Authentication_Protocol&printable=yes, Sep. 30, 2009.

* cited by examiner

*Primary Examiner* — Chi Pham
*Assistant Examiner* — Robert Lopata (57) ABSTRACT

A system is provided comprising processor, memory, radio transceiver, and an application. The transceiver receives a first message containing a first source media access control address and a first destination address and associated with a first application type and receives a second message containing a second source address and second destination address and associated with the first application type, wherein the first and second destination addresses are associated with first and second members, respectively, of a physical wireless local area network. The application receives the first message, determines that the first message is associated with the first application type, confirms that the first source address is associated with the first application type, and based on the confirmation sends the first message to the first destination. The application receives the second message, determines the second address is not associated with the first application type, and does not forward the second message.

20 Claims, 5 Drawing Sheets

CONDITIONAL MEDIA ACCESS CONTROL ADDRESS FILTERING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic devices on wireless or wired networks exchange messages in packets containing control information, instructions, and data payloads. Some packets are structured to be delivered to specific destinations while other packets may be associated with less reliable broadcast or multicast services. Encapsulation permits logically separate functions in a network to be abstracted from their underlying structures by inclusion of information concealed within higher level objects. The more abstract layers are often called the upper layer protocols and provide application and presentation services while the layers more specific to hardware and message exchange may be called lower layer protocols. The transmission control protocol/internet protocol (TCP/IP) suite, for example, uses encapsulation to provide abstraction of protocols and services at several levels, with the lower or link level containing hardware addressing and frame information, the internet and transport levels providing session and connection services, and the application level containing data payload.

SUMMARY

In an embodiment, a communication system is provided comprising a processor, a memory storing information associating a first media access control (MAC) address to a first application type, and a radio transceiver that receives a first message containing a first source media access control address and a first destination media access control address and associated with a first application type. The radio transceiver receives a second message containing a second source media access control address and a second destination media access control address and associated with the first application type, wherein the first destination media access control address is associated with a first member of a physical wireless local area network and the second destination media access control address is associated with a second member of the physical wireless local area network. The system also comprises an application stored in the memory that, when executed by the processor, receives the first message from the radio transceiver, analyzes the first message to determine that the first message is associated with the first application type, accesses the memory to confirm that the first source media access control address is associated with the first application type, and based on the confirmation sending the first message to the radio transceiver to transmit to the first destination media access control address. The application also receives the second message from the radio transceiver, analyzes the second message to determine that the second message is associated with the first application type, determines by accessing the memory that the second source media access control address is not associated with the first application type, and based on the negative determination not forwarding the second message to the radio transceiver to transmit.

In an embodiment, a processor-implemented method of communication is provided. The method comprises receiving a first multicast message associated with a first application type from a first device, wherein the first device is a member of a physical wireless local area network. The method also comprises transmitting the first multicast message to a second device based on a media access control address of the second device being associated with the first application type in a data store, the second device being a member of the physical wireless local area network. The method comprises stopping transmission of the first multicast message to a third device based on a media access control address of the third device not being associated with the first application type in the data store, the third device being a member of the physical wireless local area network.

In an embodiment, a wireless access point is provided comprising a processor and a memory storing information associating a first application type to a first media access control (MAC) address and a second media access control address and associating a second application type to the first media access control address and a third media access control address, wherein the first media access control address is associated with a first member of a physical wireless local area network, the second media access control address is associated with a second member of the physical wireless local area network, and the third media access control address is associated with a third member of the physical wireless local area network. The wireless access point also comprises a radio transceiver and an application stored in the memory that, when executed by the processor, receives a first message from the radio transceiver, the first message being a multicast message and associated with the first application type and sends the first message to the radio transceiver for transmission to the first media access control address based on the information associating the first media access control address to the first application type. The wireless access point also sends the first message to the radio transceiver for transmission to the second media access control address based on the information associating the second media access control address to the first application type. The wireless access point does not send the first message to the radio transceiver for transmission to the third media access control address.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a communication system that conditionally filters messages transmitted on a wireless local area network based on the media access control address of at least one of the source electronic device and the receiving electronic device. A filtering application associated with a wireless access point on the network examines the hardware or media access control addresses of the source and destination devices and further examines the application layer header of messages to determine the type of application associated with the message. For some applications, no address filtering takes place because all packet transmissions are permitted for the applications regardless of source and destination devices. For other applications, however, the filtering application consults a database table to determine whether the source device is permitted to send messages associated with the application and/or determine whether the destination device is permitted to receive messages associated with the application. The present disclosure teaches the creation of a plurality of virtual application local area networks by segmenting a single physical wireless local area network according to media access control addresses of electronic devices either permitted or denied access to some applications. Filtering application-related messages by media access control address of sending and/or receiving device may effectively enforce application access permissions.

Conditional filtering of messages is based on the application type and the media access control addresses of the sending and/or receiving electronic devices. The media access control addresses and network addresses of the electronic devices are not altered by the filtering application. When the filtering application determines from examining the table that a received message should not be forwarded to at least one destination device because either the source or destination device was marked as not authorized, the filtering application may block outgoing ports on the wireless access point to prevent the message from being sent. The message that is prohibited by the entry in the database table is not delivered and may be discarded.

The present disclosure teaches a plurality of electronic devices sending and receiving messages on a wireless local area network operating in infrastructure mode wherein electronic devices may exchange messages through the wireless access point instead of directly with each other. Electronic devices may be members of media local area networks and communicate using the simple service discovery protocol in multicast transmissions. In an example, the filtering application may be configured to block simple service discovery protocol multicast transmissions to certain electronic devices while permitting such transmissions to other electronic devices. The filtering application may at the same time not filter any packets when, for example, the application involved is a hypertext transport protocol (HTTP) application. Each electronic device has its own physical or virtual port on the wireless access point that may be blocked by the filtering application when directed by an entry in the database table. Every packet that is received by the communication system, regardless of its associated media access control address, may be directed to specific devices that are associated with the wireless access point by blocking some ports and opening others. This capability associated with application types permits the creation of a plurality of virtual application local area networks among electronic devices in a single physical wireless local area network.

Figure 1:
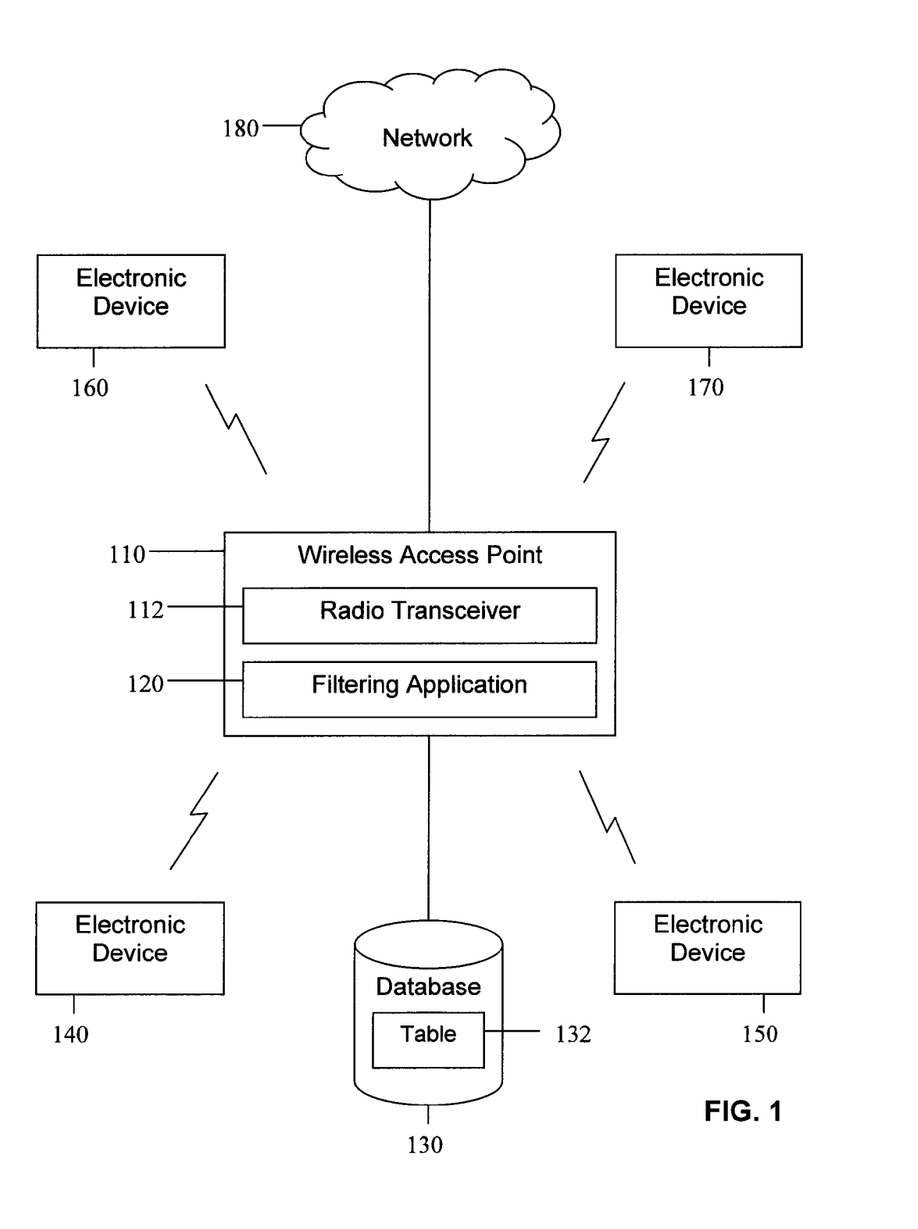
FIG. 1 is a block diagram of a system according to an embodiment of the disclosure.

Turning now to FIG. 1, a system 100 of conditional media access control address filtering is described. The system 100 comprises a wireless access point 110, a radio transceiver 112, a filtering application 120, a database 130, a table 132, electronic devices 140, 150, 160, 170, and a network 180. In examples discussed herein, the electronic device 140 may be referred to as the first electronic device 140, the electronic device 150 may be referred to as the second electronic device 150, the electronic device 160 may be referred to as the third electronic device 140, and the electronic device 170 may be referred to as the fourth electronic device 170.

The present disclosure teaches a plurality of electronic devices 140, 150, 160, 170 in a wireless local area network (WLAN) functioning in infrastructure mode wherein the electronic devices 140, 150, 160, 170 may communicate directly with the wireless access point 110 in a virtual hub and spoke arrangement. The wireless access point 110 may provide a central wireless connection point for the electronic devices 140, 150, 160, 170 that may not communicate directly with each other. The wireless access point 110 may provide connectivity to the network 180 for the electronic devices 140, 150, 160, 170, for example to the Internet. The wireless access point 110 also comprises the radio transceiver 112 permitting the wireless access point 110 to send and receive wireless signals to and from the electronic devices 140, 150, 160, 170, and other devices.

The filtering application 120 may execute on the wireless access point 110 or on a device associated with the wireless access point 110. The filtering application 120 receives a plurality of wireless messages from the radio transceiver 112 sent by the electronic devices 140, 150, 160, 170. The filtering application 120 also forwards a plurality of wireless messages to destination electronic devices 140, 150, 160, 170, and other destination devices through the radio transceiver 112. The filtering application 120 analyzes the packet content of the received messages and determines the applications, application types, media types, and/or file types associated with the messages. The filtering application 120 may examine the media access control address of the electronic device 140 sending the message and may examine the media access control address of the electronic device 150 designated as recipient of the message. The filtering application 120 may consult the table 132 stored in the database 130 to determine if an application or an application type invoked in the message is subject to filtering. If so, the filtering application 120 may further consult the table 132 to determine if the media access control addresses of either the sending electronic device 140 or the receiving electronic device 150 are listed among those to be denied access to the application or type of application.

The filtering application 120 may automatically forward all traffic associated with an application to destination electronic devices 140, 150, 160, 170 without filtering. The filtering application 120 may forward traffic associated with other applications or application types only to specific electronic devices 140, 150, 160, 170. When the radio transceiver 112 operating on the wireless access point 110 receives a wireless transmission from an electronic device 140, the filtering application 120 analyzes the packet structure of the incoming transmission. The filtering application 120 examines the media access control address of the electronic device 140 that originated the message to establish the identity of the sending electronic device 140. The filtering application 120 further analyzes the message to determine the application type being invoked by the message and any electronic devices 150, 160, 170, Internet Protocol (IP) address(es), or other device(s) or address(es) described as destination(s) for the message.

The present disclosure teaches filtering of incoming messages by media access control address of sending electronic device 140 and/or by destination electronic device 150 conditioned by the application type invoked. The application type invoked may be identifiable by the upper layer protocol used, for example, the simple service discovery protocol (SSDP) or the hypertext transfer protocol (HTTP), or may be identifiable in another manner. When the filtering application 120 determines that a specific application type is invoked in the message, it may consult the table 132 in the database 130 to discover the media access control addresses of electronic devices 140, 150, 160, 170 that are permitted to send and/or receive messages involving the application. When the application in the message is not listed in the table 132, the filtering application 120 may disregard any further information in the table 132 and forwards the message on to its specified destination(s) in accordance with the addressing in the message. The filtering application 120 may block transmissions and discard packets originated by an electronic device 140 that is not authorized to send packets for applications shown in the table 132.

The filtering application 120, in addition to filtering packets conditioned on application or upper layer protocol used and originating electronic device 140, also filters packets by application and destination electronic device 150. When the filtering application 120 engages the wireless access point 112 to forward packets, the filtering application 120 may determine that some electronic devices 150, 160, 170 have been listed in the table 132 as specifically those that should be denied receipt of the packets. The filtering application 120 may cause one or more physical or virtual ports on the wireless access point 112 to be blocked and thereby stop the identified destination electronic devices 150, 160, 170 from receiving the packets. While the wireless access point 112 may receive and transmit the packets as broadcast messages, the filtering application 120 uses the table 132 to determine potential destination electronic devices 150, 160, 170 that should be specifically denied receipt of packets for some applications. The ports on the wireless access point 112 to those electronic devices 150, 160, 170 are blocked while the message is being transmitted through the ports of the devices permitted to receive the message.

Electronic devices 140, 150, 160, 170 on a wireless local area network may send a variety of types of packets. Some electronic devices 140, 150, 160, 170 may be members of one or more media local area networks, such as a network that may observe the digital living network alliance (DLNA) standard, wherein the simple service discovery protocol is the default protocol used in multicast transmissions. While some electronic devices 140, 150, 160, 170 may have the capability to send, receive, and understand packets using a plurality of communication protocols, there may be devices with which the electronic devices 140, 150, 160, 170 communicate that are limited in their ability to understand protocols. A media local area network in a home, for example, may include devices, such as televisions, picture frame devices, and household appliances that may only process simple service discovery protocol multicasts. The same media local area network may also include several electronic devices 140, 150 that may, for example, be powerful personal computers running a plurality of applications with network adapters installed and capable of communicating over the Internet with distant destinations. The wireless access point 110 may itself be a member of at least one media local area network and may receive broadcast, multicast, and unicast traffic from a plurality of electronic devices 140, 150, 160, 170 and other devices that may or may not be members of the media local area network(s) of which the wireless access point 110 is a member.

When the wireless access point 110 receives a message via its associated radio transceiver 112, the filtering application 120 analyzes the message based in part on the application layer header of the message. The application layer header identifies the type of application involved in the message. For example, the application layer header may identify the application protocol as one of the hypertext transfer protocol (HTTP), the file transfer protocol (FTP), or the simple network management protocol (SNMP). When electronic devices 140, 150, 160, 170 are members of media local area networks, the application layer header or other upper-level layer of messages transmitted by these devices may identify the simple service discovery protocol. The filtering application 120, upon reading the application layer header of messages, examines the table 132 in the database 130 to determine if the application type named in the application layer header is included in the table 132, thereby indicating that media access control address filtering may be appropriate. If so, the filtering application 120 consults the table 132 to determine if the sending and/or receiving electronic devices 140, 150, 160, 170 are included in the table 132 as either permitted or denied source or destination devices. The filtering application 120 then blocks messages originated from electronic devices 140, 150, 160, 170 that are shown in the table 132 as not authorized to send messages associated with the application type. The filtering application 120 additionally blocks messages addressed to electronic devices 140, 150, 160, 170 that are shown in the table 132 as not authorized to receive messages associated with the application type.

The radio transceiver 112 may, for example, receive a first message containing a first source media access control address from the first electronic device 140 and may receive a second message containing a second source media access control address from the second electronic device 150. Both messages designate the same application type in their application layer headers and both messages are intended for a third electronic device 160. In this example, the first message comprises a simple service discovery protocol message. The filtering application 120 may examine the table 132 and in the example determines that the media local area application invoked in both messages is included in the list of applications wherein the table 132 should be further examined for filtering of source and destination electronic devices 140, 150, 160. The filtering application 120 then examines the table and in the example determines that the first electronic device 140 is associated with the application but the second electronic device 150 is not associated with the application. Based on these determinations, the filtering application 120 sends the first message to the radio transceiver 112 for its forwarding to the destination third electronic device 160. The filtering application 120 does not forward the second message to the third electronic device 160 and may discard the packets associated with the second message. The filtering application 120 may alternatively forward both messages but at about the same time block the port on the wireless access point 110 to the third electronic device 160 when the second message is being sent, effectively discarding the second message.

In some contexts, the first electronic device 140, the second electronic device 150, and the third electronic device 160 may be referred to as a first member, a second member, and a third member of a physical wireless local area network, respectively. A first application is associated with the media access control addresses of the first electronic device 140 and the second electronic device 150. A second application is associated with the media access control addresses of the first electronic device 140 and the third electronic device 160. The associations of the applications with the electronic devices 140, 150, 160 would be described in the table 132 in the database 130.

In the example, the radio transceiver 112 receives a first message associated with the first application. The first message is a multicast message. The filtering application 120 receives the first message from the radio transceiver 112 and determines from examining the table 132 that filtering of media access control addresses applies with the first application. The filtering application 120 further determines from the table 132 that the first electronic device 140 and the second electronic device 150 should receive the first message but the third electronic device 160 should not receive the first message. Because the first message was received as a multicast message, the filtering application 120 may cause the first message to be forwarded as a multicast message, i.e. the first message is not somehow altered to exclude the third electronic device 160. Instead, the filtering application 120 blocks the port on the wireless access point 110 associated with the third electronic device 160. When the first message is forwarded by the wireless access point 110, it reaches the first electronic device 140 and the second electronic device 150 but does not reach the third electronic device 160 because its port on the wireless access point 110 was blocked.

Continuing with the example, the radio transceiver 112 then receives a second message associated with the second application. Like the first message, the second message is a multicast message. The filtering application 120 receives the second message from the radio transceiver 112 and determines from examining the table 132 that filtering of media access control addresses also applies with the second application as it did with the first application. The filtering application 120 further determines from the table 132 that the first electronic device 140 and the third electronic device 160 should receive the second message but the second electronic device 150 should not receive the second message. Because the second message was received as a multicast message, the filtering application 120 may cause the second message to be forwarded as a multicast message, similar to what took place with the first message. Instead, the filtering application 120 blocks the port on the wireless access point 110 associated with the second electronic device 150. When the second message is forwarded, it reaches the first electronic device 140 and the third electronic device 160 but does not reach the second electronic device 150 because its port on the wireless access point 110 was blocked.

Continuing with the example, the filtering application 120 further receives a third message from the radio transceiver 112. The third message is a multicast message and is associated with a third application type. In this example, the third application type is a hypertext transport protocol (HTTP) application type. The filtering application 120 consults the table 132 as it did with the first message and the second message and determines that the table 132 does not require filtering for the hypertext transport protocol application type. The filtering application 120 sends the third message to the radio transceiver 112 for transmission to the first electronic device 140, the second electronic device 150, and the third electronic device 160. No ports on the wireless access point 110 are blocked.

The discussion herein regarding filtering by media access control address describes the denial of the electronic device 140 receipt of a message as the closing or blocking of the virtual or physical port on the wireless access point 110 associated with the electronic device 140. In an embodiment, electronic devices 140, 150, 160, 170 may listen for radio frequency signals on a variety of channels during particular time slots or periods, for example, using a form of time division multiplexing. When the time slot associated with electronic device 140 occurs, for example, if the message for the electronic device 140 is to be blocked, nothing is transmitted by the wireless access point 110 during that time slot. In other embodiments, other techniques of blocking a virtual or physical port between the wireless access point 110 and one or more of the electronic devices 140, 150, 160, 170 may be employed.

The filtering application 120 further provides an interface for entering information into the table 132 defining associations between application types and media access control addresses of the physical wireless local area network. The interface also provides a function for adding a guest media access control address to the table 132 to permit a guest device on the physical wireless local area network to access the Internet via the wireless access point 110.

The network 180 promotes communication between the components of the system 100. The network 180 may be any communication network including a public data network (PDN), a public switched telephone network (PSTN), a private network, and/or a combination.

The present disclosure teaches the effective creation of a plurality of virtual application local area networks within a single wireless local area network by segmenting the physical wireless local area network based on both an application or application type associated with messages and by the media access control addresses of either source or destination electronic devices 140, 150, 160, 170. The physical local area network may be segmented for each application by the media access control addresses of each electronic device 140, 150, 160, 170. For example, a first application may be available to electronic device 140 and 150, a second application may be available to electronic devices 140 and 160, and a third application may be available to electronic devices 150 and 160. The table 132 would contain individual entries for the three applications listing the electronic devices 140, 150, 160 permitted access to each application. For a given application, the filtering application 120 filters out messages from electronic devices 140, 150, 160, 170 not permitted access to the application. Filtering effectively creates three different application local area networks within the single wireless local area networks, even though the three application local area network may overlap somewhat in terms of the individual electronic devices 140, 150, 160, 170 that are permitted access to each application.

Figure 2:
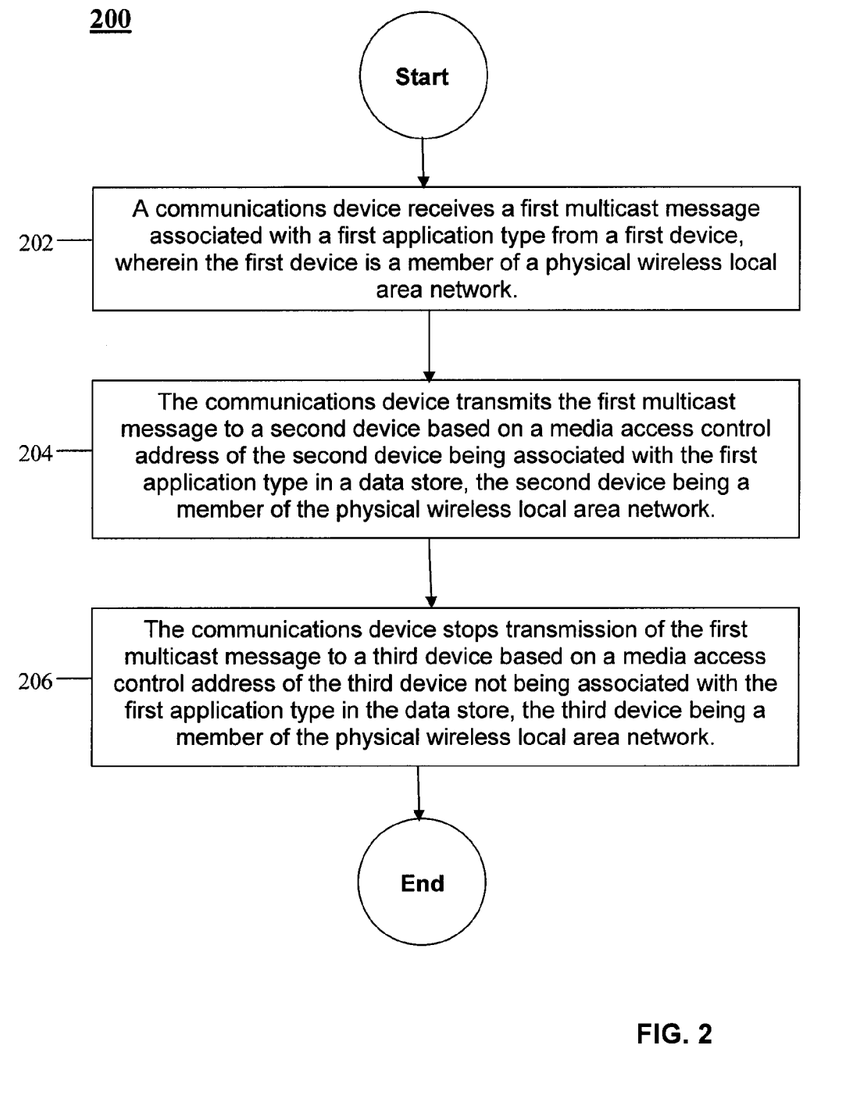
FIG. 2 is a flow chart illustrating a method according to an embodiment of the disclosure.

Turning now to FIG. 2, a processor-implemented method 200 of communication is provided. Beginning at block 202, the wireless access point 110 receives a first multicast message associated with a first application type from the first electronic device 140, wherein the first electronic device 140 is a member of a wireless local area network. The first multicast message comprises a simple service discovery protocol message.

At block 204, the wireless access point 110 transmits the first multicast message to the second electronic device 150 based on the media access control address of the second electronic device 150 being associated with the first application type in a data store, for example, the table 132 residing in the database 130. The second electronic device 150 is also a member of the wireless local area network.

At block 206, the wireless access point 110 stops transmission of the first multicast message to the third electronic device 160 based on the media access control address of the third electronic device 160 not being associated with the first application type in the data store. The third electronic device is also a member of the wireless local area network. In the method 200, the data store, for example table 132, describes the first application type as subject to filtering. The data store lists the second electronic device 150 as authorized to receive messages from the first electronic device 140 but further lists the third electronic device 160 as not authorized to receive messages from the first electronic device 140. The filtering application 120 forwards the first multicast message in the same manner in which it was received but may block or close the physical or virtual port on the wireless access point 110 associated with the third electronic device 160, effectively denying the third electronic device 160 receipt of the first multicast message.

Expanding upon the discussion of the method 200, the wireless access point 110 may receive a second multicast message associated with a second application type from the fourth electronic device 170 wherein the fourth electronic device 170 is also a member of the wireless local area network. The wireless access point 110 transmits the second multicast message to the second electronic device 150 and the third electronic device 160 based on the media access control addresses of both destination devices being associated with the second application type in the data store. Whereas the data store or table 132 blocked transmissions of messages to the third electronic device 160 associated with the first application type, the data store permits transmission of messages to the third electronic device 160 when messages are associated with the second application type. The table 132 may list each application type separately and for each listed application type, the table 132 may list electronic devices 140, 150, 160, 170 that are either approved to receive messages or to be denied receipt of messages.

The filtering application 120 defined a first entry in the data store or data table 132 that associated the media access control address of the second electronic device 150 with the first application type. The filtering application 120 defined a second entry in the data store that associated the media access control address of second electronic device 150 with the second application type. The filtering application 120 further defined a third entry in the data store that associated the media access control address of the third electronic device 160 with the second application type.

Expanding further upon the discussion of the method 200, the filtering application 120 may also define a fourth entry in the data store or data table 132 that identifies the media access control address of the fourth electronic device 170. The filtering application 120 stops transmission of the first multicast message to the fourth electronic device 170 based on the media access control address of the fourth electronic device 170 not being associated with the first application type in the data store. The data store either lists the fourth electronic device 170 to be specifically denied receipt of messages associated with the first application type or excludes the fourth electronic device 170 from a list of electronic devices 140, 150 approved for receipt of messages associated with the first application type. The filtering application 120 then receives a message from the fourth electronic device 170 containing a destination internet protocol address outside the wireless local area network. The wireless access point 110 transmits the message from the fourth electronic device 170 to a router outside the wireless local area network. The filtering application 120 may have consulted the table 132 and determined that no filtering is applied to the application being used by the fourth electronic device 170 to contact an address outside the wireless local area network or that filtering does not apply when contacting addresses outside the wireless local area network under any circumstances.

Figure 3:
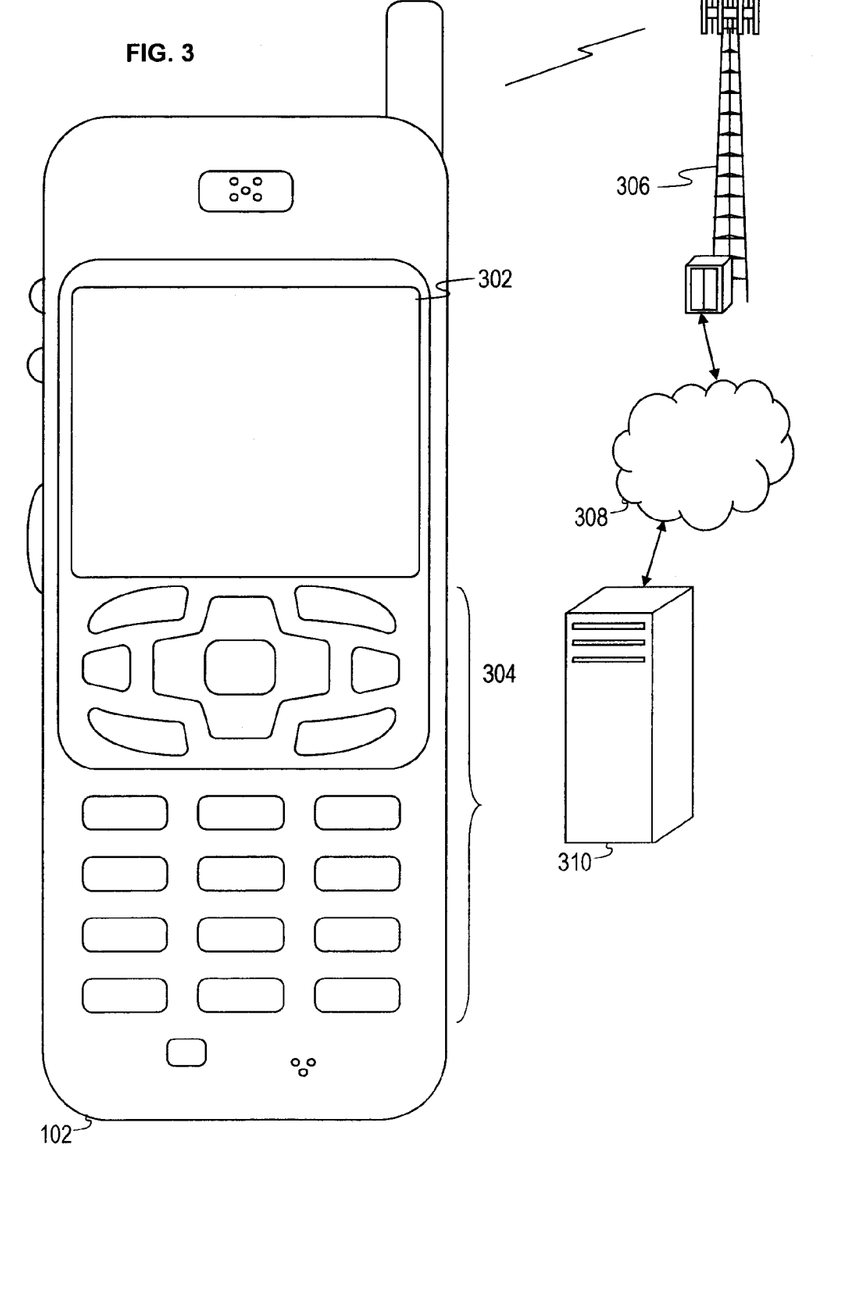
FIG. 3 is an illustration of a mobile device according to an embodiment of the disclosure.

FIG. 3 shows a wireless communications system including a mobile device 102. FIG. 3 depicts the mobile device 102, which is operable for implementing aspects of the present disclosure, but the present disclosure should not be limited to these implementations. The mobile device 102 may in some embodiments exemplify the electronic devices 140, 150, 160, 170 described in the system 100. Though illustrated as a mobile phone, the mobile device 102 may take various forms including a personal computer, a mobile computer, a portable computer, a tablet computer, a laptop computer, and a desktop computer. The mobile device 102 may take various forms with a screen size reduced to a maximum of 4 inches by 6 inches, including a mobile telecommunication device, a mobile handset, a personal digital assistant (PDA), a handheld gaming device, a handheld wireless mobile device, a pager, a digital camera, a digital music player, a digital calculator, and other portable electronic devices. The operator of the portable electronic device may select content formats based on the reduced screen size. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 302 and a touch-sensitive surface and/or keys 304 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point 110, or a peer mobile device 102.

The mobile device 102 may execute a web browser application which enables the display 302 to show a web page. The web page may be obtained via wireless communications with a base transceiver station (BTS) 306, a wireless network access node, a peer mobile device 102, or any other wireless communication network or system. While a single base transceiver station 306 is illustrated, it is understood that the wireless communication system may comprise additional base transceiver stations. In some instances, the mobile device 102 may be in communication with multiple base transceiver stations 306 at the same time. The base transceiver station 306 (or wireless network access node) is coupled to a wired network 308, such as the Internet. Via the wireless link and the wired network, the mobile device 102 has access to information on various servers, such as a server 310. The server 310 may provide content that may be shown on the display 302. Alternatively, the mobile device 102 may access the base transceiver station 306 through a peer mobile device 102 acting as an intermediary, in a relay type or hop type of connection.

Figure 4:
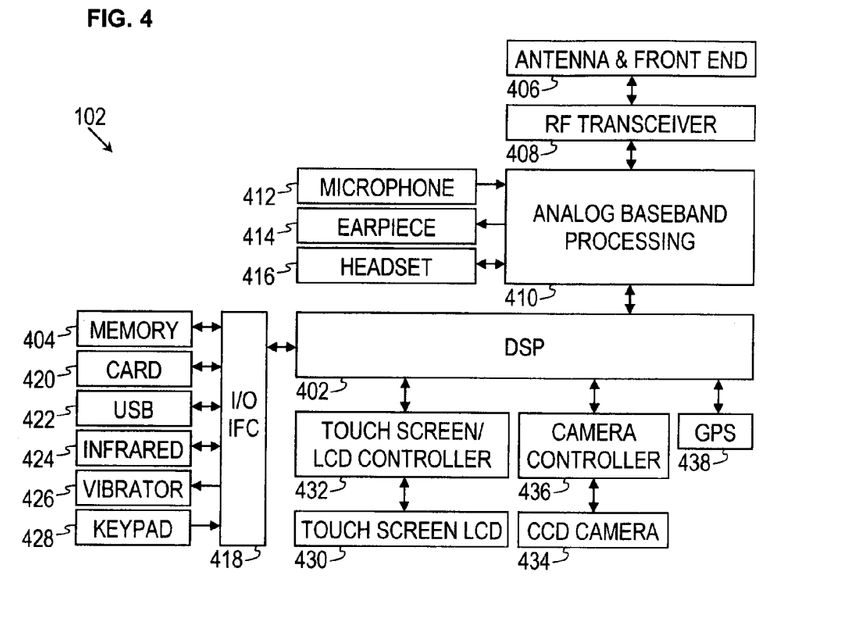
FIG. 4 is a block diagram of a mobile device according to an embodiment of the disclosure.

FIG. 4 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 402 and a memory 404. As shown, the mobile device 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the mobile device 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the mobile device 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 102 to send and receive information from a radio access network (RAN) or some other available wireless communications network or from a peer mobile device 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the mobile device 102 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example, by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 102 to function as a peripheral device to exchange information with a personal computer or other computer system. The infrared port 424 and other optional ports such as a Bluetooth interface or an IEEE 802.11 compliant wireless interface may enable the mobile device 102 to communicate wirelessly with other nearby handsets and/or wireless base stations.

The input/output interface 418 may further connect the DSP 402 to the vibrator 426 that, when triggered, causes the mobile device 102 to vibrate. The vibrator 426 may serve as a mechanism for silently alerting the user to any of various events such as an incoming call, a new text message, and an appointment reminder.

The keypad 428 couples to the DSP 402 via the input/output interface 418 to provide one mechanism for the user to make selections, enter information, and otherwise provide input to the mobile device 102. Another input mechanism may be the touch screen/LCD 430, which may also display text and/or graphics to the user. The touch screen/LCD controller 432 couples the DSP 402 to the touch screen LCD 430.

The CCD camera 434 enables the mobile device 102 to take digital pictures. The DSP 402 communicates with the CCD camera 434 via the camera controller 436. The GPS sensor 438 is coupled to the DSP 402 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 5:
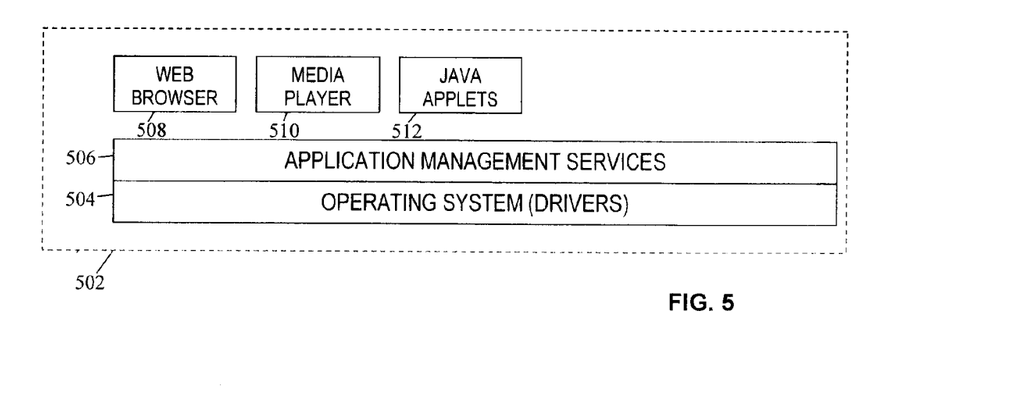
FIG. 5 is a block diagram of a software architecture for a mobile device according to an embodiment of the disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the mobile device 102. Also shown in FIG. 5 are a web browser application 508, a media player application 510, and JAVA applets 512. The web browser application 508 configures the mobile device 102 to operate as a web browser, allowing a user to enter information into forms and select links to retrieve and view web pages. The media player application 510 configures the mobile device 102 to retrieve and play audio or audiovisual media. The JAVA applets 512 configure the mobile device 102 to provide games, utilities, and other functionality.

Figure 6:
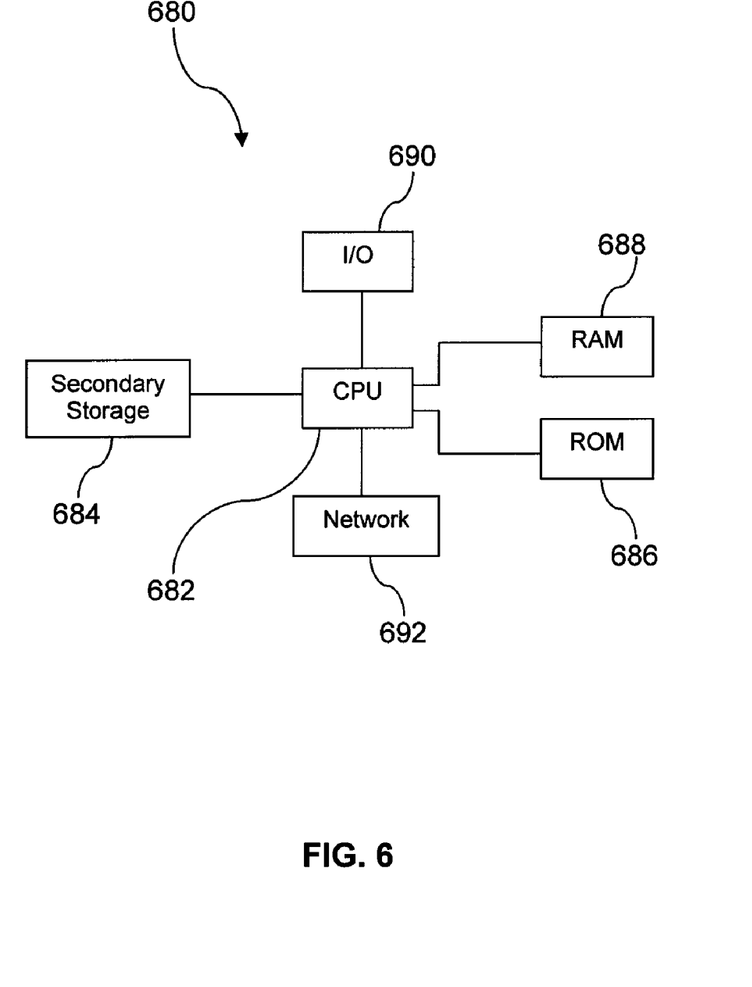
FIG. 6 illustrates an exemplary computer system suitable for implementing some aspects of the several embodiments of the disclosure.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data in part by directly accessing the computer program product, for example by reading from a CD-ROM disk inserted into a disk drive peripheral of the computer system 680. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication system, comprising:
a processor;
a memory storing information associating a first media access control (MAC) address to a first application type;
a radio transceiver that receives a first multicast message containing a first source media access control address and a first destination media access control address, and receives a second multicast message containing a second source media access control address and a second destination media access control address, wherein the first multicast message invokes the first application type, wherein the second multicast message invokes the first application type, and wherein the first destination media access control address is associated with a first member of a physical wireless local area network and the second destination media access control address is associated with a second member of the physical wireless local area network; and
a filtering application stored in the memory that, when executed by the processor,
receives the first multicast message from the radio transceiver, analyzes the first multicast message to determine that the first multicast message invokes the first application type, accesses the memory to confirm that the first source media access control address is associated with and authorized to send messages that invoke the first application type, and based on the confirmation sending the first multicast message to the radio transceiver to transmit to the first destination media access control address, and
receives the second multicast message from the radio transceiver, analyzes the second multicast message to determine that the second multicast message invokes the first application type, determines by accessing the memory that the second source media access control address is not associated with and not authorized to send messages that invoke the first application type, and based on the negative determination not forwarding the second multicast message to the radio transceiver to transmit.

2. The communication system of claim 1, wherein the first application type is a media local area network application type.

3. The communication system of claim 2, wherein the first multicast message comprises a simple service discovery protocol message.

4. The communication system of claim 1, wherein the filtering application analyzes the first multicast message based on reading an application layer header of the first multicast message and analyzes the second multicast message based on reading an application layer header of the second multicast message.

5. The communication system of claim 1, wherein the first destination media access control address and the second destination media access control address are a multicast address.

6. The communication system of claim 1, wherein the communication system comprises a wireless access point operating in an infrastructure mode.

7. A processor-implemented method of communication, comprising:
   receiving a first multicast message from a first device, wherein the first multicast message invokes a first application type, and wherein the first device is a member of a physical wireless local area network;
   determining that the media access control address of a second device is authorized to receive messages that invoke the first application type by consulting a data store, wherein the second device is a member of the physical wireless local area network;
   transmitting the first multicast message to the second device;
   determining that the media access control address of a third device is not authorized to receive messages that invoke the first application type by consulting the data store, wherein the third device is a member of the physical wireless local area network; and
   stopping transmission of the first multicast message to the third device.

8. The method of claim 7, further comprising:
   receiving a second multicast message from a fourth device, wherein the second multicast message invokes a second application type and the fourth device is a member of the physical wireless local area network;
   determining that the media access control address of the second device is authorized to receive messages that invoke the second application type by consulting the data store;
   transmitting the second multicast message to the second device;
   determining that the media access control address of the third device is authorized to receive messages that invoke the second application type by consulting the data store; and
   transmitting the second multicast message to the third device.

9. The method of claim 8, further comprising:
   defining a first entry in the data store that authorizes the media access control address of the second device to receive messages that invoke the first application type;
   defining a second entry in the data store that authorizes the media access control address of second device to receive messages that invoke the second application type;
   defining a third entry in the data store that authorizes the media access control address of the third device to receive messages that invoke the second application type.

10. The method of claim 9, wherein the data store defines a first virtual application local area network authorized to receive messages invoking the first application type and defines a second virtual application local area network authorized to receive messages invoking the second application type, wherein the members of the first and second virtual application local area networks comprise members of the physical wireless local area network.

11. The method of claim 7, wherein the first multicast message comprises a simple service discovery protocol message.

12. The method of claim 9, further comprising:
   defining a fifth entry in the data store that identifies a media access control address of a fifth device;
   stopping transmission of the first multicast message to the fifth device based on the media access control address of the fifth device not being authorized to receive messages invoking the first application type in the data store, the fifth device being a member of the physical wireless local area network;
   receiving a message from the fifth device containing an internet protocol address outside of the physical wireless local area network; and
   transmitting the message from the fifth device to a router outside of the physical wireless local area network.

13. A wireless access point, comprising:
   a processor;
   a memory storing information authorizing a first media access control (MAC) address and a second media access control address to receive messages invoking a first application type and authorizing the first media access control address and a third media access control address to receive messages invoking a second application type, wherein the first media access control address is associated with a first member of a physical wireless local area network, the second media access control address is associated with a second member of the physical wireless local area network, and the third media access control address is associated with a third member of the physical wireless local area network;
   a radio transceiver; and
   a filtering application stored in the memory that, when executed by the processor,
      receives a first multicast message from the radio transceiver, the first multicast message invoking the first application type,
      determines that the information in the memory authorizes the first media access control address to receive messages invoking the first application type,
      sends the first multicast message to the radio transceiver for transmission to the first media access control address,
      determines that the information in the memory authorizes the second media access control address to receive messages invoking the first application type,
      sends the first multicast message to the radio transceiver for transmission to the second media access control address,
      determines that the information in the memory does not authorize the third media access control address to receive messages invoking the first application type, and
      does not send the first multicast message to the radio transceiver for transmission to the third media access control address.

14. The wireless access point of claim 13, wherein the filtering application further receives a second multicast message from the radio transceiver, the second multicast message invoking the second application type, determines that the information in the memory authorizes the first media access control address to receive messages invoking the second application type, sends the second multicast message to the radio transceiver for transmission to the first media access control address, determines that the information in the memory does not authorize the second media access control address to receive messages invoking the second application type, does not send the second multicast message to the radio transceiver for transmission to the second media access control address, and determines that the information in the memory authorizes the third media access control address to receive messages invoking the second application type, sends the second multicast message to the radio transceiver for transmission to the third media access control address.

15. The wireless access point of claim 13, wherein the application further receives a third multicast message from the radio transceiver, the third multicast message invoking a third application type, sends the third multicast message to the radio transceiver for transmission to the first media access control address, sends the third multicast message to the radio transceiver for transmission to the second media access control address, and sends the third multicast message to the radio transceiver for transmission to the third media access control address.

16. The wireless access point of claim 15, wherein the third application type is a hyper text transport protocol application type.

17. The wireless access point of claim 13, wherein the application further provides an interface for entering information into the memory defining authorizations of application types and media access control addresses of members of the physical wireless local area network.

18. The wireless access point of claim 17, wherein the interface provides a function for adding a guest media access control address to the memory to permit a guest device on the physical wireless local area network to access the Internet via the wireless access point.

19. The wireless access point of claim 13, wherein the application further receives a fourth message from the second member of the physical wireless local area network, wherein the fourth message invokes the second application type; and does not send the fourth message to the radio transceiver.

20. The wireless access point of claim 13, wherein the first application type is a media local area network application.

* * * * *